(12) United States Patent
Chambero et al.

(10) Patent No.: US 10,672,214 B2
(45) Date of Patent: Jun. 2, 2020

(54) METHOD FOR SECURING AN ELECTRONIC DEVICE, AND CORRESPONDING ELECTRONIC DEVICE

(71) Applicant: IDEMIA FRANCE, Courbevoie (FR)

(72) Inventors: Francis Chambero, Colombes (FR); Marco De Oliveira, Colombes (FR)

(73) Assignee: IDEMIA FRANCE, Courbevoie (FR)

( * ) Notice: Subject to any disclaimer, the term of this patent is extended or adjusted under 35 U.S.C. 154(b) by 20 days.

(21) Appl. No.: 16/099,887

(22) PCT Filed: May 5, 2017

(86) PCT No.: PCT/FR2017/051089
§ 371 (c)(1),
(2) Date: Nov. 8, 2018

(87) PCT Pub. No.: WO2017/194862
PCT Pub. Date: Nov. 16, 2017

(65) Prior Publication Data
US 2019/0139351 A1 May 9, 2019

(30) Foreign Application Priority Data
May 9, 2016 (FR) .................................... 16 54122

(51) Int. Cl.
*G06Q 20/20* (2012.01)
*G06Q 20/32* (2012.01)
(Continued)

(52) U.S. Cl.
CPC ............. *G07F 7/082* (2013.01); *G06Q 20/20* (2013.01); *G06Q 20/3227* (2013.01);
(Continued)

(58) Field of Classification Search
CPC ....................................................... G07F 7/082
See application file for complete search history.

(56) References Cited

U.S. PATENT DOCUMENTS

| 2009/0259588 A1 | 10/2009 | Lindsay |
| 2011/0185435 A1 | 7/2011 | Chang |

(Continued)

FOREIGN PATENT DOCUMENTS

| EP | 2 407 920 A1 | 1/2012 |
| WO | 02/39222 A2 | 5/2002 |
| WO | 2010/070539 A1 | 6/2010 |

OTHER PUBLICATIONS

Balfe, 2009, "Secure Payment Architectures and Other Applications of Trusted Computing", University of London.*

(Continued)

*Primary Examiner* — Olabode Akintola
*Assistant Examiner* — Brandon M Duck
(74) *Attorney, Agent, or Firm* — MH2 Technology Law Group, LLP (57) ABSTRACT

A method and corresponding electronic device for securing the device. The device and method may include operations for: receiving a command requesting a modification of an operating parameter of the electronic device (C2); detecting whether the operating parameter is a parameter that is predefined as a sensitive parameter; and if so, determining whether the modification requested by the command, if applied, would lead to a degradation of the security of the electronic device. The determining may be done by comparing the initial state of the parameter on receiving the command with a new state for giving to the operating parameter in response to the command. And, in the event of the security of the electronic device being degraded, triggering an operation of securing the electronic device in response to the first command.

15 Claims, 3 Drawing Sheets

(51) Int. Cl.
*G06Q 20/34* (2012.01)
*G06Q 20/40* (2012.01)
*G06F 7/08* (2006.01)
*G06F 7/12* (2006.01)
*G07F 7/08* (2006.01)
*G06Q 20/38* (2012.01)
*G07F 7/12* (2006.01)

(52) U.S. Cl.
CPC ........... *G06Q 20/34* (2013.01); *G06Q 20/382* (2013.01); *G06Q 20/409* (2013.01); *G07F 7/084* (2013.01); *G07F 7/12* (2013.01)

(56) References Cited

U.S. PATENT DOCUMENTS

| | | |
|---|---|---|
| 2013/0119130 A1 | 5/2013 | Braams |
| 2014/0324698 A1 | 10/2014 | Dolcino et al. |
| 2014/0344166 A1* | 11/2014 | Maddocks ......... G06Q 20/4012 |
| | | 705/72 |
| 2016/0309323 A1* | 10/2016 | Zarakas ................ H04W 12/06 |
| 2017/0116604 A1* | 4/2017 | Lacoss-Arnold ...... G06Q 20/40 |

OTHER PUBLICATIONS

International Search Report dated Jul. 19, 2017, International Application No. PCT/FR2017/051089, 3 pages.

* cited by examiner

METHOD FOR SECURING AN ELECTRONIC DEVICE, AND CORRESPONDING ELECTRONIC DEVICE

CROSS-REFERENCE TO RELATED APPLICATIONS

This application is a U.S. National Stage application of International Application No. PCT/FR2017/051089 filed 5 May 2017, which claims priority to French Application No. 1654122 filed 9 May 2016, the entire disclosures of which are hereby incorporated by reference in their entireties.

BACKGROUND OF THE INVENTION

The present invention lies in the general field of electronic devices, and it relates more particularly to an electronic device, e.g. such as a smart card, that is suitable for co-operating with an external terminal in order to perform a transaction, e.g. in the field of banking.

The invention applies more particularly, but in non-exclusive manner, to smart cards (or microcircuit cards) that comply with the ISO 7816 standard, for example. The invention relates in particular to making secure a smart card operating in compliance with the Europay Mastercard Visa (EMV) protocol.

In general manner, a smart card is designed to communicate with a device that is external to the card, otherwise known as a terminal or reader. Such cards enable various types of transaction to be carried out, such as for example payment transactions, direct debit transactions, or indeed authentication of the bearer. By way of example, smart cards for banking applications (credit cards, debit cards, etc.) are suitable for co-operating with payment terminals or with automatic teller machines (ATMs) in order to perform various financial operations.

EMV is the standardized protocol that is nowadays in the most widespread use throughout the world, in particular for securing payment transactions carried out with smart cards.

The EMV protocol was designed to reduce the risk of fraud during a payment transaction, in particular by making it possible to authenticate both the smart card and its bearer. The authentication process relies on a combination of cryptograms (or encrypted keys) and of digital signatures, and it optionally requires the bearer of the card to input a secret code (commonly referred to as a personal identification number (PIN)).

Depending on the type of card used, on the situation, or indeed the amount in question, an EMV card may operate on-line or off-line. In on-line mode, the EMV card may communicate via the reader with the corresponding issuing entity (the bank from which the card originates, for example) in order to verify in particular that the current transaction is legitimate. In contrast, if the EMV card is operating in off-line mode, it applies previously-stored verification criteria in order to decide whether the transaction is to be authorized or refused.

Numerous security mechanisms have recently been developed in order to make the increasing use of smart cards, as secure as possible, in particular for cards of the EMV type.

Nevertheless, smart cards are nowadays subjected to a type of malicious attack for which no satisfactory protection has yet been developed. This attack consists in sending a so-called "script" command from the entity that issued the smart card for the purpose of modifying one or more operating parameters of the card. The modification generally relates to sensitive operating parameters of the card such as the counts in internal counters or limiting thresholds to be complied with (limits on off-line payment, etc.). The command may also relate to updating the configuration of the smart card, leading to a sensitive change in the way the smart card processes transactions.

In the context of such an attack, the script commands that are sent are authentic in the sense that they present all of the characteristics of a valid script command as generated and sent by the issuer of the card in order to modify one or more of its operating parameters. Nevertheless, such script commands are fraudulent in intention in the sense that such commands are sent without prior authorization of the issuer (e.g. the bank).

Insofar as these script commands present all the characteristics of a valid command (authentic message authentication code (MAC) cryptogram, etc.), they are normally executed by smart cards.

Such fraudulent script commands may be sent in particular with the connivance of a malicious person having access to the communications interface of the issuer. For example this person may be an ill-intentioned employee of the bank that issued the smart card, or indeed a third party or a program having access to infrastructures that enable such commands to be sent. That is why this type of attack is sometimes referred to as an "insider" attack, since such fraudulent commands are generally sent from the entity that issued the smart card concerned.

The risks in terms of security are thus particularly high because of the sensitive character of the operating parameters that can be modified fraudulently in a smart card during such an attack. This risk is further increased by the fact that a large number of fraudulent script commands can be sent massively to multiple smart cards.

At present, there thus exists a need to make secure smart cards (in particular of the EMV type), and more generally any electronic device suitable for co-operating with an external terminal in order to implement a transaction. In particular, at present, no satisfactory solution exists for mitigating the security risks associated with an attack of the insider type, as explained above.

OBJECT AND SUMMARY OF THE INVENTION/SUMMARY

To this end, the present invention provides a security method implemented by an electronic device, said method comprising:

a receive step for receiving a first command requesting a modification of at least one operating parameter of the electronic device;

a detection step for detecting whether said at least one operating parameter is a parameter that is predefined as a parameter that is sensitive in the electronic device;

if so, a determination step for determining whether said modification requested by the first command, if applied, would lead to a degradation of the security of the electronic device, by comparing the initial state of said at least one parameter on receiving said first command with a new state for giving to said at least one operating parameter in response to the first command; and in the event of the security of said electronic device being degraded, a trigger step for triggering at least one securing operation for securing the electronic device in response to said first command.

The invention serves advantageously to secure the electronic device appropriately in the event of it detecting that a script command is requesting a modification to one of its sensitive operating parameters. It is thus possible to adapt the processing by the electronic device of script commands that seek to modify an operating parameter in such a manner as to limit the risks involved for said device in terms of security.

The invention serves in particular to provide the electronic device with effective protection in the event of a potential attack of the "insider" type, as described above, when a fraudulent script command is received by the device in question. The electronic device can adapt its security response to a received script command by performing a specific security operation and it can do this even if the authenticity and the integrity of said script command are verified successfully by the electronic device.

In a particular implementation, the electronic device is a smart card, e.g. in compliance with the ISO 7816 standard.

In a particular implementation, the electronic device detects that the operating parameter is a parameter predefined as a sensitive parameter if the first command includes any predefined identifier from a list of at least one predefined identifier.

In a particular implementation, if at least one parameter is detected as being a parameter predefined as a sensitive parameter, using said at least one operating parameter to determine a verification to be performed;

with the electronic device performing said verification during said determination step for determining whether said requested modification, if applied, would lead to a degradation of the security of the device.

In a particular implementation, the electronic device verifies whether said new state is greater than or less than the initial state of said at least one parameter; and on the basis of said verification, determines whether said requested modification, if applied, would lead to a degradation of the security of the electronic device.

In a particular implementation, the electronic device determines that the modification requested by the first command, if applied, would lead to a degradation of the security of the electronic device if the difference in value between the new state and the initial state of said at least one parameter reaches a predefined threshold value.

In a particular implementation, said at least one securing operation comprises at least one of the following:
  storing a message for sending, said message providing information about receiving said first command;
  sending said message;
  storing the initial state of said at least one operating parameter;
  applying said modification to said at least one operating parameter so as to change its state from the initial state to the new state; and
  storing in a log file data representative of receiving said first command.

In a particular implementation, after said storing of the initial state and applying the modification causing said at least one operating parameter to change from the initial state to the new state, the electronic device restores the initial state or a predefined state for said at least one operating parameter in response to a restore command. In a particular example, the predefined state is a default state that is different from the new state.

In a particular implementation, the electronic device receives said first command during a first transaction implemented by the electronic device, and wherein the electronic device receives the restore command during a second transaction implemented by the electronic device, said second transaction being subsequent to the first transaction.

In a particular implementation, the first command includes a MAC type cryptogram.

In a particular implementation, the first command is a PUT DATA command in accordance with the ISO 7816 standard, said first command causing the new state to be given to said at least one operating parameter.

In a particular implementation, the electronic device is a smart card suitable for implementing a transaction in cooperation with a reader terminal.

In a particular implementation, the electronic device is an EMV card, at least one of the first and second commands being a script command received during an EMV transaction after said EMV card has sent an ARQC message in accordance with the EMV standard.

In a particular implementation, said first command includes the new state to be given to said at least one operating parameter.

In a particular embodiment, the various steps of the security method are determined by computer program instructions.

Consequently, the invention also provides a computer program on a data medium (or recording medium), the program being suitable for being implemented in an electronic device (such as a smart card) or more generally in a computer, the program including instructions adapted to implementing steps of a security method as defined above.

The computer program may use any programming language, and be in the form of source code, object code, or code intermediate between source code and object code, such as in a partially compiled form, or in any other desirable form.

The invention also provides a computer-readable data medium (or recording medium) that includes instructions of a computer program as mentioned above.

The data medium may be any entity or device capable of storing the program. For example, the medium may comprise storage means, such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides an electronic device comprising:
  a receive module for receiving a first command requesting a modification of at least one operating parameter of the electronic device;
  a detection module for detecting whether said at least one operating parameter is a parameter predefined as being a parameter that is sensitive in the electronic device;
  a determination module configured, in the event of a positive result of said detection by said detection module, to determine whether said modification requested by the first command, if applied, would lead to a degradation of the security of the electronic device, by comparing the initial state of said at least one parameter on reception of said first command with a new state to be given to said at least one operating parameter in response to the first command; and a security module, configured, in the event of a positive result of said determination by the determination module, to trigger at least one predefined security operation for securing the electronic device in response to said first command.

In an embodiment, the invention is embodied by software and/or hardware components. In this context, the term "module" as used in this document may correspond equally well to a software component or to a hardware component or to a set of hardware and software components.

It should be observed that the various implementations mentioned above with respect to the security method of the invention and the associated advantages apply in analogous manner to the electronic device of the invention.

BRIEF DESCRIPTION OF THE DRAWINGS

Other characteristics and advantages of the present invention appear from the following description made with reference to the accompanying drawings, which show implementations having no limiting character. In the figures.

DETAILED DESCRIPTION OF IMPLEMENTATIONS

As mentioned above, the present invention relates to electronic devices, e.g. such as smart cards, that are suitable for co-operating with an external terminal in order to perform a transaction, e.g. in the field of banking.

The invention proposes securing smart cards against attacks of the insider type, and more particularly against fraudulent script commands as described above.

Figure 1:
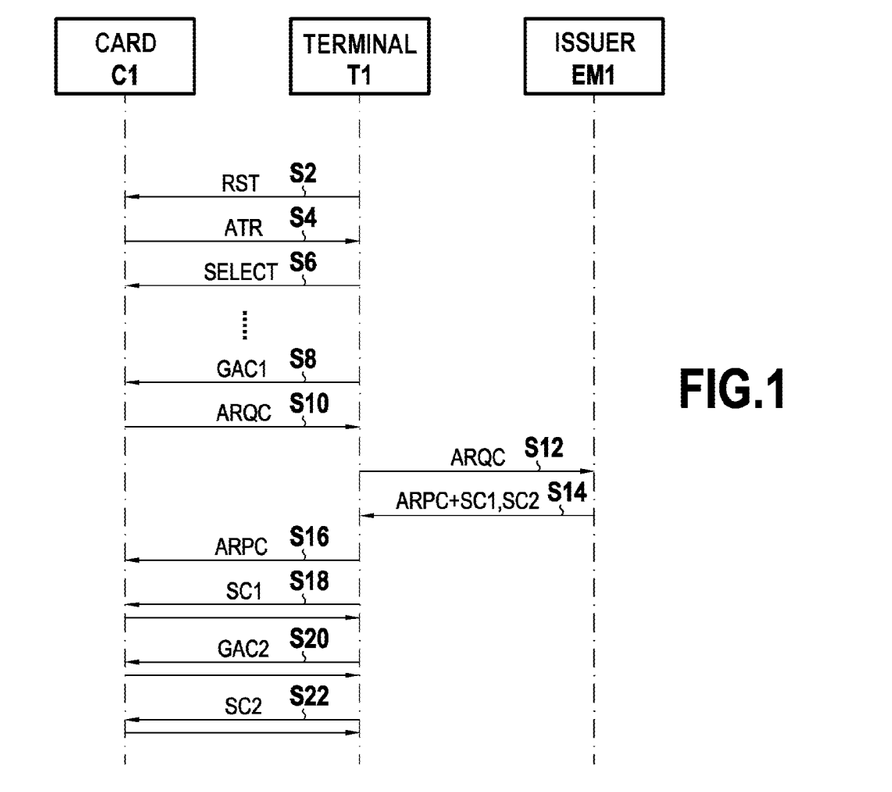
FIG. 1 is a diagram showing the steps performed by a smart card, by an external terminal, and by the issuer of the smart card when implementing an EMV transaction.

FIG. 1 shows an example of a payment transaction in compliance with the EMV protocol using a smart card C1. In this example, the card C1 is an EMV card.

While implementing a transaction, the EMV protocol is organized as three stages, although variants are nevertheless possible. It can be understood that certain elements and operations generally implemented during an EMV transaction are voluntarily omitted since they are not necessary for understanding the present invention.

During a first stage for authenticating the smart card C1 being used, the terminal T1 and the card C1 exchange a RESET (RST) message during S2 followed by a response ATR during S4.

During S6, the bearer of the card uses the terminal T1 to select the desired mode for the transaction, thereby causing a "SELECT" command to be sent to the card C1 in order to initiate the beginning of the EMV transaction.

Once the stage of authenticating the card has been completed, the EMV protocol proceeds with a stage (not shown) of authenticating the bearer of the card C1. The terminal T2 determines which bearer authentication method to apply and in particular it determines whether the transaction is to be performed in a mode with code verification or in a mode without code verification. If code verification mode is selected, the smart card C1 verifies the validity of the PIN code input by the bearer on the terminal T1. In contrast, if the mode without code verification is selected, then no PIN code verification is performed. This situation may arise for example when the terminal is not capable of taking charge of verifying a PIN code. Under such circumstances, a handwritten signature of the bearer may optionally be required in order to authenticate the bearer.

Once the stage of authenticating the bearer has been completed, the EMV protocol initiates the stage of verifying the transaction. To do this, the terminal T1 sends (S8) the smart card C1 a first APDU command known as GENERATE AC for GAC (written herein GAC1). This well-known command contains information about the current transaction such as the amount of the transaction, the currency being used, the type of the transaction, etc.

The EMV card then verifies the transaction against predefined verification criteria and then responds by sending (S10) a cryptogram (or cryptographic certificate) including a message authentication code (MAC). This authentication code MAC may for example be encrypted using a cryptographic key stored in the card C1. The response of the card C1 in the message ARQC depends in particular the settings of the card as established by the entity that issues said card (referred to herein as the "issuer").

More precisely, in the example of FIG. 1, during S10 the smart card C1 sends during S10 a message of the authorization request cryptogram (ARCQ) type indicating that the card seeks to continue with the transaction on-line, e.g. with a remote server of the issuer EM1 of the card C1 in use (on-line mode). The terminal T1 then transmits (S12) the cryptogram ARQC to the issuer EM1, which acts remotely to perform various verifications in order to ensure that the transaction is valid. In response, the terminal T1 then receives (S14) an encrypted message of the ARPC type indicating the decision of the issuer EM1. During S14, the terminal T1 may also receive one or more "script" commands from the issuer EM1, each requesting modification of at least one operating parameter in the smart card C1. In this example, two script commands SC1 and SC2 are sent during S14 by the issuer EM1.

The terminal T1 then sends the ARPC message (S16) and each of the script commands SC1 and SC2 (S18, S22) to the card C1.

More particularly, in the example shown in FIG. 1, the terminal T1 acts during S18 to send the script command SC1 to the card C1. In response to this command SC1, the smart card C1 modifies at least one operating parameter in appropriate manner. The terminal T1 then acts during S20 to send the smart card C1 a second well-known ADPU command of the GENERATE AC or GAC type (written herein GAC2). If the card C2 accepts the transaction, it responds to the command GAC2 by sending a cryptogram of the transaction accepted (TC) type to the terminal T1. Otherwise, the card C1 sends a cryptogram of the transaction refused (AAC) type to the terminal T1. In addition, still in this example, the terminal T1 then acts during S22 to send the script command SC2 to the card C1. In response to this command SC2, the card C1 modifies at least one operating parameter in appropriate manner.

Each script command SC1, SC2 coming from the issuer EM1 may be received during a transaction before or after receiving the command GAC2, and may give rise to an exchange of data between the card C1 and the terminal T1. The number and the natures of the script commands that are received and the ways in which they are processed by the card C1 may vary depending on circumstances.

As mentioned above, in the context of an insider type attack, the script commands SC1, SC2 may be sent by a malicious person or entity, e.g. from the communications interface of the issuer EM1 (e.g. from one of its servers).

The present invention proposes a security method that is implemented by an electronic device specifically in order to mitigate this type of malicious attack.

In various implementations, the method of the invention, e.g. as implemented by an electronic device such as a smart card, comprises: receiving a command requesting modification of one (or more) operating parameters of the electronic device, this command including a new state to be given to said operating parameter; detecting whether the operating parameter is a parameter that is predefined in the electronic device as being a sensitive parameter; if so, determining whether the requested modification, if applied, would lead to a degradation in the security of the electronic device, by comparing the initial state of the parameter on receiving said command with the new state that is to be given the said parameter; and if the security of said electronic device is going to be degraded, triggering an operation of securing the electronic device in response to said command.

The invention also relates to such an electronic device suitable for implementing a security method as defined above.

In the present disclosure, implementations of the invention are described with reference to a smart card of the EMV type. It should be understood that the invention is not limited exclusively to EMV cards, but that it applies more generally to any device suitable for implementing a transaction, including devices other than smart cards that also use the EMV standard, and electronic devices that use other transaction standards.

It should also be observed that the concept of a "transaction" should be understood broadly herein and includes, by way of example, in the field of banking, not only a payment transaction or a transfer transaction, but also consulting a bank account on a bank terminal. The various implementations of the invention are described herein in the context of a payment card for performing bank transactions. It should be understood that other types of transaction or operation can be envisaged in the ambit of the invention.

Unless indicated to the contrary, elements that are common or analogous in a plurality of figures are given the same reference signs and present characteristics that are identical or analogous, such that these common elements are generally not described again, for reasons of simplicity.

Figure 2:
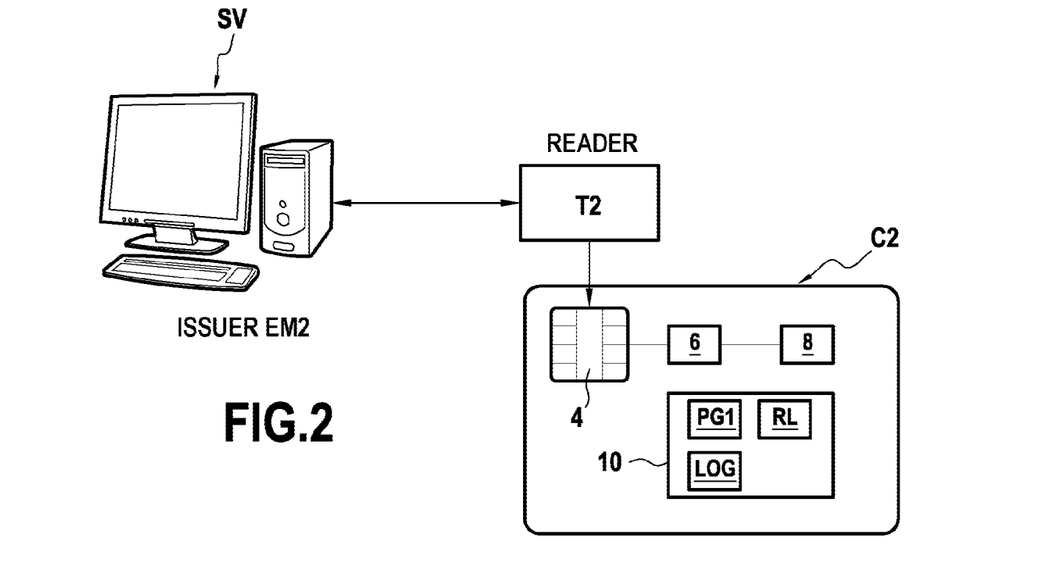
FIG. 2 is a diagram showing the structure of a smart card in a particular embodiment of the invention.

FIG. 2 is a diagram showing the structure of a smart card C2 in accordance with a particular embodiment.

It should be understood that certain elements that are generally present in a smart card are voluntarily omitted since they are not necessary for understanding the present invention. It should also be observed that the smart card C2 shown in FIG. 1 is merely one embodiment, and others are possible within the ambit of the invention. In particular, persons skilled in the art will understand that certain elements of the smart card C2 are not described herein in order to facilitate understanding the invention, since those elements are not necessary for implementing the invention.

The smart card C2 is suitable for co-operating with a terminal (or reader) T2 in order to perform a transaction, such as a financial or bank transaction (payment or other transaction) in the present example.

The terminal T2 is suitable for acting as an interface between the smart card C2 and a remote server SV. In the present example, the server SV is a server of the entity EM2 (e.g. a banking institution) that issues the smart card C2. In this example, the card C2 is capable of communicating via the terminal T2 with the remote server SV in order to use the EMV protocol to implement a so-called "on-line" transaction, i.e. a transaction involving an exchange with the issuer EM1.

More precisely, the smart card C2 in this example has external contacts suitable for co-operating with the reader T2, at least one processor 6, a volatile rewritable memory of the random access memory (RAM) type 8, and a non-volatile rewritable memory 10 (e.g. of the flash type).

Figure 6:
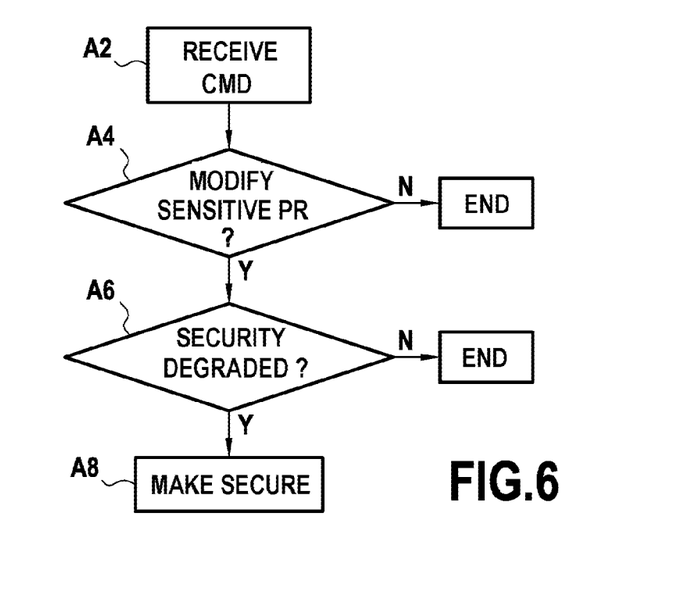
FIG. 6 is a diagram in the form of a flow chart showing the steps of a security method implemented in a particular embodiment of the invention.
Figure 7:
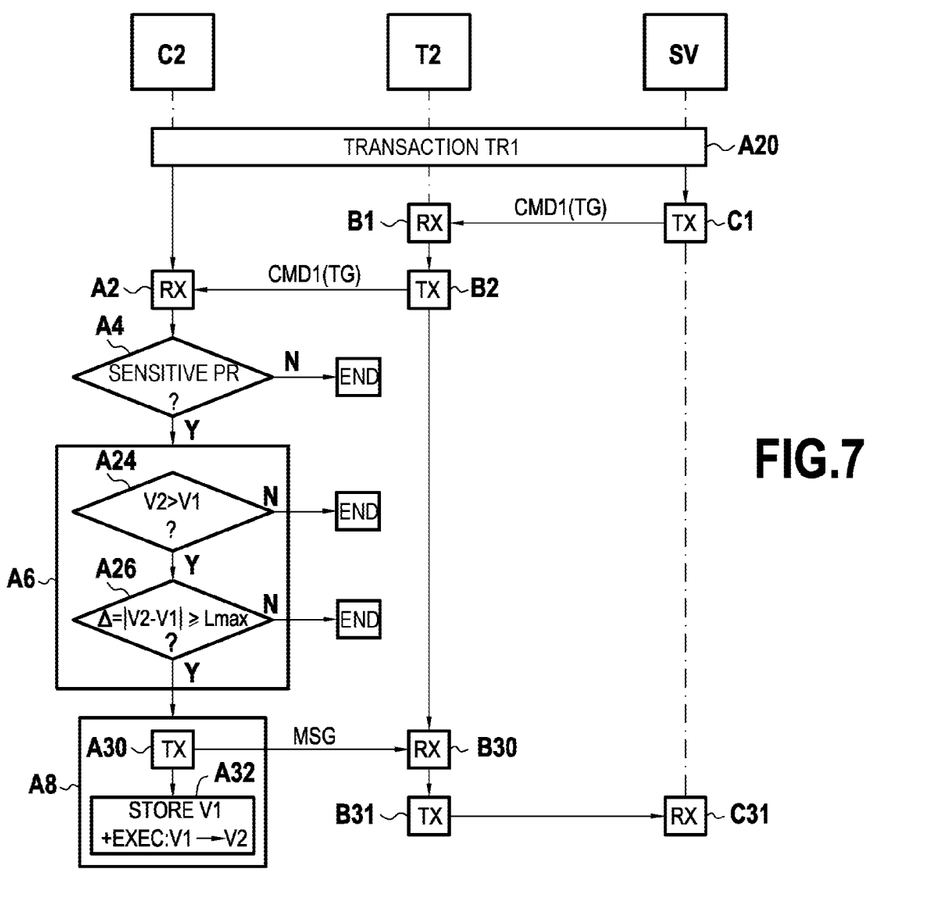
FIG. 7 is a diagram in the form of a flow chart showing the steps of a security method implemented in a particular embodiment of the invention.
Figure 8:
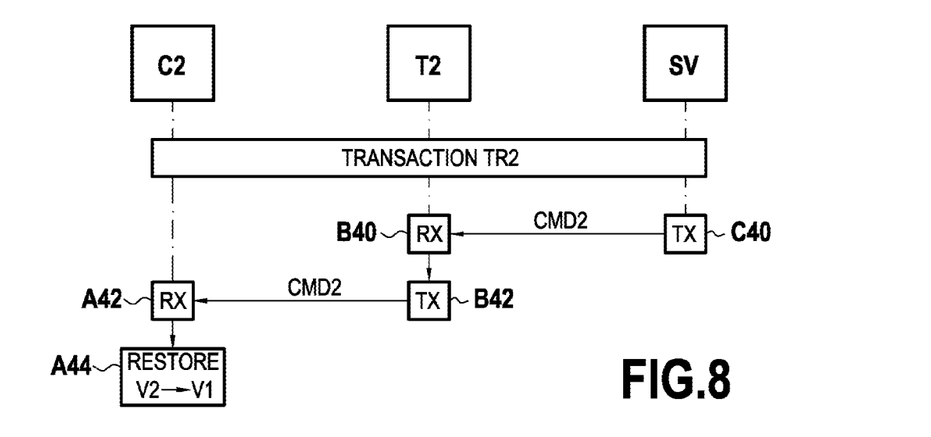
FIG. 8 is a diagram in the form of a flow chart showing the steps of a security method implemented in a particular embodiment of the invention.

In this example, the memory 10 constitutes a data medium (or recording medium) in accordance with a particular embodiment that is readable by the smart card C2 and that stores a computer program PG1 in accordance with a particular embodiment. The computer program PG1 includes instructions for executing steps of a security method in a particular implementation. The main steps of the method in particular implementations of the invention are shown in FIGS. 6, 7, and 8, as described below.

In a particular embodiment, the smart card C2 complies with the ISO 7816 standard. Under such circumstances, the external contacts 4 present characteristics complying with that standard. Nevertheless, it should be understood that other embodiments are possible. By way of example, the smart card C2 may co-operate with the reader T2 in a contactless mode using a radio frequency (RF) antenna integrated in the card C2.

Still in the example presently under consideration, a log file LOG and at least one predefined rule RL are stored in the non-volatile rewritable memory 10 of the card C2. In the example presently under consideration, the rules RL comprise four predefined rules RL1, RL2, RL3, and RL4, but other examples are possible within the ambit of the invention. The predefined rules RL and the log file LOG are described in greater detail below with reference to FIGS. 4 and 5, respectively.

Figure 3:
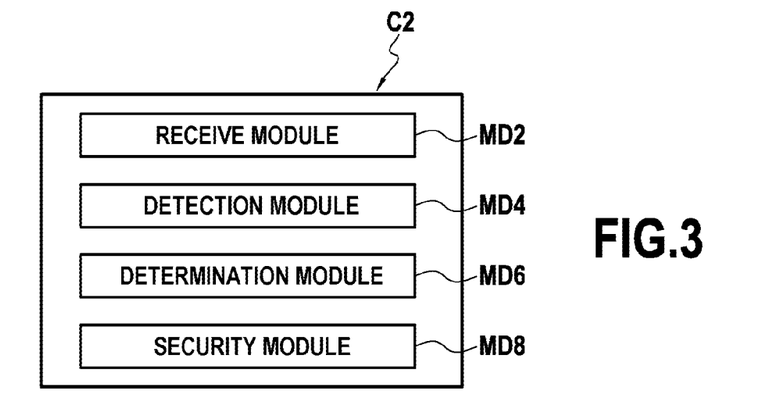
FIG. 3 is a diagram showing modules implemented in the smart card shown in FIG. 2, in a particular embodiment.

The processor 6 controlled by the computer program PG1 in this example implements a certain number of modules as shown in FIG. 3, namely: a receive module MD2, a detection module MD4, a determination module MD6, and a security module MD8.

In this example, the receive module MD2 is suitable for receiving a command (or "script" command) referenced CMD, which command requests modification of at least one operating parameter PR of the smart card C2. Examples of such script commands CMD are described below.

In a particular example, said command CMD includes a new state V2 (or a new value) to be given to said at least one operating parameter PR of the card C2. By sending such a command CMD, it is thus possible to cause the smart card C2 to modify an operating parameter PR in such a manner as to cause it to change its state from an old state (or "initial" state) V1 to a new state V2 specified in the command.

The detection module MD4 is configured to detect whether said at least one operating parameter PR that is to be modified at the request of the command CMD as received by the receive module MD2, is a parameter that is predefined as a parameter that is sensitive in the smart card C2.

Figure 4:
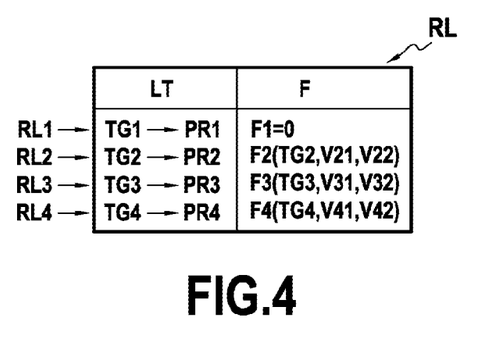
FIG. 4 is a diagram showing predefined rules stored in the smart card shown in FIG. 2, in a particular embodiment.

In a particular example shown in FIG. 4, a list LT containing at least one sensitive parameter PR is stored in the memory 10. From such a list LT, it is possible for each operating parameter PR of the smart card C2 to determine whether it is a sensitive parameter or a parameter that is not sensitive. By way of example, the operating parameters that are to be considered as "sensitive" may be defined while personalizing the smart card C2. As explained below, the operating parameter(s) that are "sensitive" in the smart card C2 can be defined in various ways from such a list LT.

In a particular example, the script command CMD received by the receive module MD2 presents a tag length value (TLV) structure. Specifically, the tag TG included in the command CMD defines the destination memory zone where the corresponding operating parameter PR is to be modified in the memory 10 of the card C2. In this example, the detection module MD4 is configured to determine whether the tag TG of the command CMD is stored in the list LT as identifying a "sensitive" parameter PR of the card C2.

In the example shown in FIG. 4, the list LT defines four tags (or identifiers) TG1, TG2, TG3, and TG4, with each of these tags corresponding to a respective operating parameter PR1, PR2, PR3, and PR4.

By way of example it is assumed that the operating parameter PR1 is not a parameter that is predefined as being a sensitive parameter in the card C2, while each of the operating parameters PR2, PR3, and PR4 is predefined as being a sensitive parameter in the card C2.

When said at least one operating parameter PR that is to be modified at the request of the received command CMD is detected as being a parameter that is sensitive in the smart card C2, the determination module MD6 is configured to determine whether said modification requested by the command CMD would, if applied, lead to a degradation (or reduction) of the security of the smart card C2. For this purpose, the determination module MD6 compares the initial state V1 of said at least one parameter PR on reception of said command CMD with the new state V2 that is to be given to said at least one parameter PR in response to the received command CMD (by way of example, the new state may be included in the command CMD).

In a particular implementation, if said at least one parameter PR is detected as being a sensitive parameter, the determination module MD6 is configured on the basis of said at least one parameter PR to determine what verification is to be performed. The determination module MD6 is then configured to determine whether said script command CMD would lead to a degradation of the card C2 by performing that previously determined verification. As explained below, said verification that is to be performed may vary depending on circumstances. The verification serves to perform an additional security step when a modification to a sensitive operating parameter is requested in the received script command CMD. In a particular example, the verification is a predefined verification function F that can be executed by the card C2.

In the example shown in FIG. 4, respective verification functions F1, F2, F3, and F4 are stored in the predefined rules RL in association with the tags TG1, TG2, TG3, and TG4. These verification functions F1-F4 are described in greater detail below in a particular implement shown in FIGS. 6, 7, and 8. In this example, these functions F define whether or not the corresponding operating parameter PR is sensitive.

Furthermore, still with reference to FIG. 3, in the event of a said degradation of the security of the card C2 being detected as described above, the security module MD8 is configured to trigger at least one predefined operation for securing the electronic device in response to the received script command CMD. Each securing operation is designed to secure the smart card C2 in response to the script command CMD. Examples of such operations are described below with reference to FIGS. 6, 7, and 8.

Figure 5:
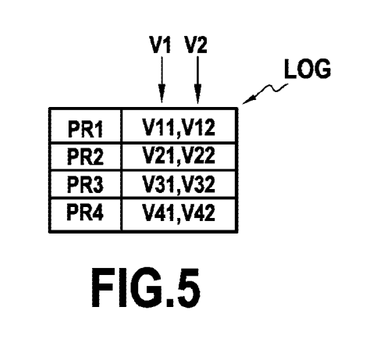
FIG. 5 is a diagram showing a log file stored in the smart card shown in FIG. 2, in a particular embodiment.

FIG. 5 is a diagram of the log file LOG in a particular implementation. This log file, which in this example is stored, in the non-volatile memory 10, is suitable for storing the initial state (or value) V1 of each operating parameter PR1-PR4 as it was on reception of a script command CMD received by the reception module MD2, together with the new state V2 as specified in the received script command CMD that is to be given to said parameter PR. The particular example of a log file LOG that is shown in FIG. 5 is described in greater detail below.

The steps performed by the smart card C2 during a security method in a particular implementation are described below with reference to FIG. 6. For this purpose, the smart card C2 executes the computer program PG1.

During a receive step A2, the card C2 receives a script command CMD requesting modification of at least one operating parameter PR of the smart card C2. In this example, said command CMD includes the new state (or value) V2 to be given to said at least one operating parameter PR, although other implementations are possible in which the new state (or value) V2 is not included in the script command CMD.

By way of example, the script command CMD is received during a current EMV transaction implemented by the smart card C2 in co-operation with the terminal T2. This script command CMD may be received at various moments during the EMV transaction, as described above with reference to FIG. 1.

In a particular example, the script command CMD is issued by the issuer EM2 of the smart card C2 (e.g. from a remote server). This command CMD includes an identifier MAC enabling the smart card C2 to verify the authenticity and the integrity of said command CMD.

The command CMD may be an APDU command, e.g. a "PUT DATA" command in compliance with the ISO 7816 standard, this command requiring a new state V2 to be given to said at least one operating parameter PR in the smart card C2. By sending such a command CMD, it is thus possible to cause the smart card C2 to modify an operating parameter PR so as to cause it to change its state from an old state V1, referred to as its "initial state", to a new state V2, as specified in said command CMD.

The nature(s) of the operating parameter(s) PR that is/are to be modified at the request of the script command CMD may vary depending on circumstances. In general manner, an operating parameter PR configures the way in which the smart card C2 processes a transaction with an external terminal, such as the reader T2 in this example.

By way of example, the operating parameter PR that is to be modified may be a count stored in the smart card C2. By way of example, such a count may represent the number of off-line transactions that have already been performed by the smart card C2, or indeed the total amount represented by the off-line transactions that have already been performed by the smart card C2. The parameter PR may also relate to a threshold value for such a count. The parameter PR may also lead to the configuration of the smart card C2 being updated so as to give rise to a change in the processing of transactions by the smart card.

In a particular example, once the script command CMD has been received, the smart card C2 also acts during A2 to verify the authenticity of the command CMD. By way of example, the authentication is performed by the card C2 on the basis of the identifier MAC included in the command CMD. The card C2 is configured to proceed to the following step A4 only if the authentication performed during A2 is successful. If authentication of the command CMD fails, the method ends (for example, the card C2 may decline the request for modifying the parameter PR included in the command CMD). In other words, the smart card C2 continues with the method only if the script command CMD is determined as being "authentic" during A2. As explained above, a script command may be authentic in the sense that it is indeed issued by the issuer EM2, but it may potentially be fraudulent in intention in the sense that the command may have been sent without prior authentication of the issuer (e.g. by an ill-intentioned employee).

During a detection step A4, the smart card C2 detects whether said at least one operating parameter PR that is to be modified at the request of the command CMD received in A2, is a parameter that is predefined as being a parameter that is sensitive in the smart card C2. As mentioned above, depending on circumstances, it is possible to vary those operating parameters PR that are considered by the smart card C2 as being sensitive or not sensitive.

For this purpose, in the presently-considered example, the smart card C2 consults the list LT in which at least one sensitive operating parameter of the smart card C2 is specified.

In a particular example, data (or a function) is stored in the smart card C2 in association with each parameter PR of the list LT, said data indicating whether or not the corresponding parameter PR is sensitive. The use of such data (or such a function) is described in greater detail in a particular example with reference to FIG. 7.

In one particular implementation, each of the parameters PR identified in the list LT is a sensitive parameter. In another implementation, each of the parameters PR identified in the list is a parameter that is not sensitive. In these variants, the smart card C2 can thus determine whether or not a given parameter PR is sensitive from the list LT without there being any need to store data (or a function) in association therewith in order to specify the sensitive or non-sensitive characteristic of the parameter PR in question.

During a determination step A6, in the event of a positive result from the detection step A4 (i.e. if at least one parameter PR for modification is predefined as being a sensitive parameter), the smart card C2 determines whether said modification requested by the received script command CMD would, if applied, lead to a degradation in the security of said smart card C2. For this purpose, the smart card C2 compares the initial state V1 of said at least one parameter PR on reception of said command CMD with the new state V2 that is to be given to said at least one parameter PR, this new state V2 (in this example) being included in the command CMD received during A2. In other words, the smart card C2 compares the old value V1 of said at least one parameter PR with its new value V2 on the assumption that the modification requested by the command CMD is applied.

It should be observed that such a degradation of security may indeed be the result of a real malicious attack against the card C2, or it may merely be a situation that is judged to be risky in security terms by the card C2.

In a particular implementation, if said at least one parameter PR is detected during A4 as being a sensitive parameter, then during A6 the smart card C2 acts on the basis of said at least one parameter PR to determine what verification is to be performed. The smart card C2 thus acts during A6 to determine whether said script command CMD leads to degradation of the card C2 by performing the verification as determined in this way. In a particular example, this verification is a predefined verification function F as explained in greater detail in the implementation shown in FIG. 7. It is thus possible to vary the way in which security degradation is evaluated as a function of the sensitive security parameter that is concerned.

In a particular implementation, while performing the determination during A6, the smart card C2 verifies whether said new state V2 is greater than or less than the initial state V1 of said at least one parameter PR that is to be modified, and then on the basis of this verification, it determines whether said modification requested by the received command CMD would, if applied, lead to a degradation of the security of the smart card C2. Depending on the configuration selected in the smart card C2, detecting an increase (or indeed a decrease) in the value of a sensitive parameter PR resulting from the script command CMD can thus be considered as constituting a degradation of the security of said card C2.

In a particular implementation, during the determination A6, the smart card C2 determines that said modification requested by the script command CMD would, if applied, lead to a degradation of the security of the electronic device if the difference in value between the new state V2 and the initial state V1 of said at least one parameter PR that is to be modified reaches at least one predefined threshold value. By way of example, the smart card C2 may be configured to detect (during A6) a degradation of security if the modification requested by the command CMD requests an increase by at least one predefined value of one of its operating parameters PR.

During a trigger step A8, if said determination A6 leads to a positive result (i.e. if a said degradation of the security of the card C2 is detected during A6), the smart card C2 triggers at least one predefined security operation in response to the received script command CMD. Each security operation seeks to make said smart card C2 secure relative to the script command CMD received during A2. The number and the nature of the security operations may vary depending on circumstances.

In a particular implementation, said at least one security operation A8 comprises at least any one of the following:
  storing a message for sending, said message giving information about said script command CMD being received during A2, and possibly sending said message (the message may include an indication of the type of event, of attack, or of security problem encountered by the smart card C2 as a result of receiving the command CMD during A2);
  storing in the log file LOG the initial state V1 of said at least one operating parameter PR, and applying said modification requested by the command CMD to said at least one operating parameter PR so as to cause its state to change from the initial state V1 to the new state V2 specified in the received script command CMD; and
  storing in the log file LOG data representative of receiving said script command CMD during A2.

Other security operations A8 are possible, such as restoring the initial state V1 to the operating parameter PR after applying the modification requested by the script command CMD, e.g. as described in greater detail in the implementation shown in FIG. 8.

The invention serves advantageously to provide additional security for the smart card C2 in the event of it detecting that a script command is requesting a modification to one of its sensitive operating parameters. It is thus possible for the processing of script commands seeking to modify an operating parameter as performed by the smart card to be adapted in such a manner as to limit the security risks involved for said card.

In particular, the invention makes it possible to provide the smart card with effective protection against a potential attack of the "insider" type as described above, in the event of a fraudulent script command being received by the card in question. The smart card C2 can adapt its security response to a received script command by performing a specific security operation, and can do so even if the authenticity and the integrity of said script command are verified successfully by the smart card.

A particular implementation of the method described with reference to FIG. 6 is described below with reference in particular to FIG. 7. It is assumed that the smart card C2 implements a security method by executing the program PG1.

It is assumed to begin with that an EMV transaction (written TR1) is ongoing (A20), this transaction being implemented in any manner by the smart card C2 in co-operation with the terminal T2, which terminal acts as the interface between the card C2 and the remote server SV of the issuer EM2. In this example, the transaction is an on-line transaction in the sense that the issuer EM2 is involved in implementing the transaction TR1.

During C1, the server SV sends a script command CMD1 to the terminal T2, which receives it during B1. The terminal T2 then forwards (B2) this command CMD1 to the smart card C2, which receives during A2.

It is assumed in this example that the command CMD1 requests a modification of a single operating parameter PR of the smart card C2, even though other implementations are possible.

The script command CMD1 includes an identifier MAC serving to verify that the command CMD1 is indeed authentic.

Furthermore, in the presently-considered example, the script command CMD1 presents a TLV structure, as mentioned above. The command CMD1 includes in particular a tag (referenced TG) defining the destination memory zone where the operating parameter PR in question is to be modified in the memory 10 of the card C2.

In this example, it is assumed that the script command CMD1 is an APDU command of the "PUT DATA" type in compliance with the ISO 7816 standard, this command ordering a new state V2 to be given to the operating parameter PR in the smart card C2. As mentioned above, such a command CMD serves to request the smart card C2 to modify an operating parameter PR so as to cause its state to change from an initial state V1 to a new state V2 as specified in the command CMD1. In this particular example, the new state (or value) V2 to be given to the operating parameter in question is included in the PUT DATA script command CMD1, even though other implementations are possible in which the new state (or value) V2 is not included in the script command.

In the particular example described above, once the script command CMD1 has been received, the smart card C2 also acts during A2 to verify the authenticity of the command CMD1. In this example, authentication is performed by the card C2 on the basis of the identifier MAC included in the command CMD1 received during A2. The card C2 is configured to proceed to the following step A4 only if this authentication during A2 is successful. If authentication of the command CMD1 fails, the method ends (by way of example, the card C2 declines the request to modify the parameter PR as requested in the command CMD1). In other words, the smart card C2 continues with the method only if the script command CMD1 is determined during A2 as being "authentic".

As mentioned above with reference to FIG. 6, the smart card acts during A4 to determine whether the operating parameter PR that is to be modified is a parameter that is predefined as being a sensitive parameter. In this particular example shown in FIG. 7, this determination is performed from the list LT in which the tags TG1, TG2, TG3, and TG4 are stored that correspond respectively with the operating parameters PR1, PR2, PR3, and PR4 (FIG. 4). During detection A4, the smart card C2 determines whether the tag TG included in the command CMD received during A2 is stored in the list LT as identifying a sensitive parameter PR of the command C2.

In the example shown in FIG. 4, the verification functions F1, F2, F3, and F4 (referenced selectively as F) are also stored in the predefined rules RL (referenced RL1 to RL4) in association respectively with the tags TG1, TG2, TG3, and TG4. Each function F indicates whether the corresponding operating parameter PR1-PR4 is sensitive or not.

In this particular example, the verification function F1 returns the value "0" (F1=0), which means that the parameter PR1 associated with the tag TG1 is predefined as being a parameter that is not sensitive in the card C2. Still in this example, the verification functions F2, F3, and F4 are as follows:

the verification function F2 (TG2, V21, V22) associated with the operating parameter PR2 takes as inputs the tag TG2, the initial value V21 of the parameter PR2, and the new value V22 to be given to the parameter PR2;

the verification function F3 (TG3, V31, V32) associated with the operating parameter PR3 takes as inputs the tag TG3, the initial value V31 of the parameter PR3, and the new value V32 to be given to the parameter PR3; and the verification function F4 (TG4, V31, V42) associated with the operating parameter PR4 takes as inputs the tag TG4, the initial value V41 of the parameter PR4 and the new value V42 to be given to the parameter PR4.

In a particular example, at least two of the functions F2, F3, and F4 are identical.

In a particular example, at least one of the functions F does not take a tag TG as input.

In a particular example, instead of and replacing the functions F, each rule RL stores a flag specifying whether the associated operating parameter PR is sensitive or not.

In the presently-considered example, during A4, the smart card C2 determines whether the parameter PR for modifying is or is not sensitive by comparing the tag TG included in the command CMD1 with the tags TG1-TG4 identified in the list LT and by determining the verification function F (if any) that is stored in a rule RL in association with the tag TG included in the command CMD1. Then, on the basis of the function F associated with the tag TG included in the command CMD1, the smart card C2 determines (A4) whether the corresponding operating parameter PR is or is not sensitive for the smart card C2. By way of example, it is assumed that the smart card detects during A4 that the tag TG included in the command CMD1 is the tag TG2, and by executing the verification function F2, it determines that the tag TG corresponds to an operating parameter that is sensitive for the smart card C2.

As already explained above with reference to FIG. 6, the smart card then determines (A6; FIG. 7) whether the modification requested by the script command CMD1, if applied, would lead to degradation of the security of the smart card C2 by comparing the initial value V1 of the sensitive parameter PR concerned, as it was on receiving the command CMD1, with the new state V2 (included in this example in the command CMD1) that is to be given to the sensitive parameter PR in question. To do this, the smart card C2 in this example executes the verification function F specified in the rule RL that is concerned in association with the tag TG included in the received command CMD1.

In this example, executing the applicable verification function F causes the comparison step A24 to be performed and in succession therewith the determination step A26, as described below.

It can be understood that the execution described below of the function F merely constitutes a non-limiting example and that the way in which the potential degradation of security is evaluated can be adapted by modifying the function F appropriately. Executing this function serves to perform an additional security check when the received script command requests a modification of a sensitive operating parameter.

During A24, the smart card C2 compares the initial state V1 of the sensitive parameter PR for modification (i.e. the current state of the parameter PR at the time said command CMD is received) with the new state V2 that is included in this example in the received command CMD1 and that is to be given to said sensitive parameter PR.

In this example, during A24, the smart card C2 verifies whether the new value V2 of the sensitive parameter PR for modification is greater than (or respectively less than) the initial value V1 of said sensitive parameter PR for modifying. In other words, the smart card C2 acts in A24 to determine whether the modification requested by the script command CMD1 causes an increase (or respectively a decrease) in the state of the sensitive parameter PR in question. In the presently-considered example, if the smart card detects during A24 that V2>V1, the method continues with A26. Otherwise, the method ends.

During A26, the smart card C2 determines whether this difference in value between the new state V2 and the initial state V1 of the sensitive parameter PR for modifying reaches at least one predefined threshold value Lmax. By way of example, the sensitive parameter PR for modifying may be any one of the following:
 a count of the number of off-line transactions that have been performed by the smart card C2;
 the total amount involved in the off-line transactions that have been performed by the smart card C2; and
 a threshold value for such a count.

If during A26 the smart card C2 determines that the difference between V1 and V2 is not less than the limiting threshold value Lmax, degradation of the security of the smart card C2 is detected and the method continues with A8. Otherwise, the method ends.

As mentioned above with reference to FIG. 6, during A8 the smart card C2 triggers (FIG. 7) at least one operation of securing the smart card C2 in response to the received script command CMD1. As mentioned above, the number and the nature of these securing operations (or actions) may vary depending on circumstances.

The smart card C2 can thus implement an appropriate security response as a function of the security problem encountered.

In the example shown in FIG. 7, the smart card C2 performs security operations A30 and A32, as described below.

During A30, the smart card C2 sends a message MSG to the server SV of the issuer EM2. The terminal T2 receives the message MSG during B30 and forwards it to the server SV during B31. The server SV receives the message MSG during C31.

The message MSG includes data representative of the degradation of security as detected during A6. This message advantageously enables the smart card C2 to inform the server SV (and possibly also the terminal T2, if the terminal takes this information into account) of the type of security problem encountered by the smart card C2 as a result of receiving the command CMD1 during A2.

The message MSG may be sent during A30 by the smart card C2 during the transaction TR1, e.g. before or after receiving a message GAC2, as described above with reference to FIG. 1.

In a particular example, the message MSG is an EMV transaction message as defined by the EMV protocol, this message including said data representative of the degradation of security detected during A6.

In a particular example, the message MSG is sent during A30 during a new EMV transaction subsequent to the transaction TR1.

Furthermore, the smart card C2 acts during A32 to store the initial state (or value) V1 of the sensitive parameter PR for modifying, i.e. the state as presented by said parameter PR when the smart card C2 received the script command CMD1. In this example, and as shown in FIG. 5, the initial state V1 is stored (A32) in the log file LOG in association with the corresponding sensitive parameter PR.

Furthermore, still during A32, the smart card C2 applies the modification to the sensitive parameter PR as requested by the script command CMD1. To do this, the smart card C2 in this example executes the PUT DATA command by giving said sensitive parameter PR the new state V2 requested by the command CMD1. The smart card C2 may optionally also store the new state V2 in the log file LOG in association with the corresponding sensitive parameter PR and its initial state V1.

In the presently-described implementation, the smart card C2 thus executes the received script command CMD1 even though a security risk has been detected. By precaution, the smart card C2 nevertheless informs the issuer EM2 and stores the initial state V1 of the sensitive parameter PR in memory so that the smart card C2 and/or an external entity (e.g. such as the issuer EM2) can access it subsequently. Where applicable, storing (A32) the initial state V1 enables the smart card C2 to restore the initial state V1 to the corresponding sensitive parameter PR, as explained below in a particular example.

FIG. 8 shows a particular implementation in which, following the step A32 as described above with reference to FIG. 7, the smart card C2 implements an EMV transaction (written TR2) subsequent to the transaction TR1. The terminal T2 in this example also acts as the interface between the smart card C2 and the remote server SV of the issuer EM2.

During this new transaction TR2, the smart card C2 restores the initial state V1 to the sensitive parameter PR that was modified during A32, in response to a restore command CMD2 sent by the server SV.

More precisely, after initializing the transaction TR2, the server SV acts during C40 to send the restore command CMD2 to the terminal T2, which receives it during B40. Thereafter, the terminal T2 forwards (B42) this command CMD2 to the smart card C2, which receives it during A42.

During A44, the smart card C2 restores the state of the sensitive parameter PR that was modified during A32 by giving it the initial state V1 as stored in the log file LOG (in this example, V1 is different from V2).

In a particular example, the restore command CMD2 includes an identifier of the sensitive parameter PR that is to be restored so that the smart card C2 determines which sensitive parameter PR is to be restored.

Alternatively, the command CMD2 does not include such an identifier and the smart card C2 is configured to restore the state of one or more parameters in application of a predefined rule. In response to the command CMD2, the smart card C2 may for example restore the state of at least one predefined sensitive parameter PR. By way of example, this restoration is performed on the basis of the content of the log file LOG.

It should be observed that the initial state of the sensitive parameter PR that was modified during A32 need not necessarily involve a log file as shown for example in FIG. 5. In a particular example, in response to a restore command CMD2, the smart card C2 is configured to give a state (or value) that is predefined by default, which state may be different from the initial state V2 of the sensitive parameter PR in question. In this example, the state (or value) that is predefined by default is different from the new state V2.

In a particular example, in response to a restore command CMD2 the smart card C2 restores the state of all of the parameters PR that are defined as sensitive in the list LT, so as to give each of these parameters PR their initial states V1 as they were on reception A2 of the command CMD1, or states that are predefined by default, as explained above.

This particular implementation advantageously enables an external entity, e.g. such as the issuer EM2, to trigger restoration remotely of a sensitive parameter PR that previously gave rise to a degradation of the security of the smart card C2 on being modified. The issuer EM2 can thus monitor the messages MSG sent by each of its smart cards and can subsequently trigger restoration of a sensitive parameter if it judges that to be necessary.

A person skilled in the art will understand that the above-described implementations and variants merely constitute non-limiting implementations of the invention. In particular, the person skilled in the art can envisage any adaptation or combination of the above-described implementations and variants for the purpose of responding to some particular need.

The invention claimed is:

1. A security method implemented by an electronic device, said method comprising:
   receiving a first command requesting a modification of at least one operating parameter of the electronic device;
   detecting whether said at least one operating parameter is a parameter that is predefined as a parameter that is sensitive in the electronic device;
   if the parameter is predefined as a parameter that is sensitive, determining whether said modification requested by the first command, if applied, would lead to a degradation of the security of the electronic device, by comparing the initial state of said at least one operating parameter on receiving said first command with a new state for giving to said at least one operating parameter in response to the first command; and
   in the event of the security of said electronic device being degraded, triggering at least one securing operation for securing the electronic device in response to said first command.

2. The method according to claim 1, wherein detecting whether the at least one operating parameter is a parameter that is predefined as a sensitive parameter comprises: determining whether the first command includes any predefined identifier from a list of at least one predefined identifier.

3. The method according to claim 1, wherein if the at least one operating parameter is a parameter that is predefined as a sensitive parameter, the method further comprises:
   using said at least one operating parameter to determine a verification to be performed; and
   performing said verification during said determining whether said requested modification, if applied, would lead to a degradation of the security of the electronic device.

4. The method according to claim 1, wherein determining whether said modification requested by the first command, if applied, would lead to a degradation of the security of the electronic device comprises:
   verifying whether said new state is greater than or less than the initial state of said at least one operating parameter; and
   on the basis of said verifying, determining whether said requested modification, if applied, would lead to a degradation of the security of the electronic device.

5. The method according to claim 4, wherein the electronic device determines that the modification requested by the first command, if applied, would lead to a degradation of the security of the electronic device when the difference in value between the new state and the initial state of said at least one operating parameter reaches a predefined threshold value.

6. The method according to claim 1, wherein said at least one securing operation comprises at least one of the following:
   storing a message for sending, said message providing information about receiving said first command;
   sending said message;
   storing the initial state of said at least one operating parameter;
   applying said modification to said at least one operating parameter so as to change a state of said at least one operating parameter from the initial state to the new state; and
   storing in a log file data representative of receiving said first command.

7. The method according to claim 6, wherein, after said storing of the initial state and said applying the modification, the method further comprises: restoring the initial state or a predefined state for said at least one operating parameter in response to a restore command.

8. The method according to claim 7, wherein the electronic device receives said first command during a first transaction implemented by the electronic device, and wherein the electronic device receives the restore command during a second transaction implemented by the electronic device, said second transaction being subsequent to the first transaction.

9. The method according to claim 1, wherein the first command includes a MAC type cryptogram.

10. The method according to claim 1, wherein the first command is a PUT DATA command in accordance with the ISO 7816 standard, said first command causing the new state to be given to said at least one operating parameter.

11. The method according to claim 1, wherein the electronic device is a smart card suitable for implementing a transaction in co-operation with a reader terminal.

12. The method according to claim 11, wherein the electronic device is an EMV card, and at least one of the first command and a second command is a script command received during an EMV transaction after said EMV card has sent an ARQC message in accordance with the EMV standard.

13. The method according to claim 1, wherein said first command includes the new state to be given to said at least one operating parameter.

14. A non-transitory computer readable media including instructions that are executed by a computer of an electronic device to perform operations comprising:
receiving a first command requesting a modification of at least one operating parameter of the electronic device;
detecting whether the at least one operating parameter is a parameter that is predefined as a parameter that is sensitive in the electronic device;
if the parameter is predefined as a parameter that is sensitive, determining whether the modification requested by the first command, if applied, would lead to a degradation of the security of the electronic device, by comparing the initial state of the at least one operating parameter upon receiving the first command with a new state that will be given to the at least one operating parameter in response to the first command; and
in the event of the security of said electronic device being degraded, triggering at least one securing operation for securing the electronic device in response to the first command.

15. An electronic device comprising:
a receive module for receiving a first command requesting a modification of at least one operating parameter of the electronic device;
a detection module for detecting whether said at least one operating parameter is a parameter predefined as being a parameter that is sensitive in the electronic device;
a determination module configured, in the event of a positive result of said detection by said detection module, to determine whether said modification requested by the first command, if applied, would lead to a degradation of the security of the electronic device, by comparing the initial state of said at least one operating parameter on reception of said first command with a new state to be given to said at least one operating parameter in response to the first command; and
a security module, configured, in the event of a positive result of said determination by the determination module, to trigger at least one predefined security operation for securing the electronic device in response to said first command.

* * * * *